(12) United States Patent
Berruet et al.

(10) Patent No.: US 11,512,740 B2
(45) Date of Patent: Nov. 29, 2022

(54) COMBINED INSULATOR AND CONDUCTOR ASSEMBLY FOR BEARINGS WITH ADJUSTABLE CONDUCTOR

(71) Applicant: AKTIEBOLAGET SKF, Gothenburg (SE)

(72) Inventors: Nicolas Berruet, Artannes sur Indre (FR); Paul Feliciano, Saint Cyr-sur-Loire (FR); Mathieu Hubert, Turin (IT); Tommy Jullien, Ambillou (FR); Gene Kovacs, Brighton, MI (US); Thomas Perrotin, Saint Roch (FR); Dave Christopher Rybski, White Lake, MI (US); Anthony Simonin, Tours (FR); Collin Snyder, Northville, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 11 days.

(21) Appl. No.: 17/210,168

(22) Filed: Mar. 23, 2021

(65) Prior Publication Data

US 2021/0310518 A1 Oct. 7, 2021

(30) Foreign Application Priority Data

Apr. 3, 2020 (IT) .................. 102020000007054

(51) Int. Cl.
*F16C 41/00* (2006.01)
*F16C 19/16* (2006.01)

(52) U.S. Cl.
CPC ............ *F16C 41/002* (2013.01); *F16C 19/16* (2013.01); *F16C 2202/24* (2013.01); *F16C 2202/32* (2013.01)

(58) Field of Classification Search
CPC .. F16C 35/077; F16C 41/002; F16C 2202/24; F16C 2202/32
See application file for complete search history.

(56) References Cited

U.S. PATENT DOCUMENTS

| 4,801,270 A | 1/1989 | Scarlata |
| 5,735,615 A | 4/1998 | Pontzer |
| (Continued) | | |

FOREIGN PATENT DOCUMENTS

| DE | 202014105015 U1 | 10/2014 |
| DE | 102017106695 | 4/2018 |
| (Continued) | | |

OTHER PUBLICATIONS

Written Opinion and Search Report from the Italian Patent Office dated Nov. 11, 2020 in related Italian application No. 102020000007051, and translation thereof.

(Continued)

*Primary Examiner* — James Pilkington
(74) *Attorney, Agent, or Firm* — J-Tek Law PLLC; Scott T. Wakeman; Mark A. Ussai (57) ABSTRACT

A combined electrical insulator and conductor assembly for a bearing disposable between a shaft and a housing includes an annular insulator disposable about the bearing outer ring and configured to prevent electric current flow between the outer ring and the housing and including a plurality of projections extending axially along and spaced circumferentially about a centerline. A conductor includes a conductive disk with an outer radial end engageable with the housing inner surface, an inner radial end defining a central opening for receiving the shaft and openings each receiving a separate one of the plurality of projections of the insulator such that the disk is axially displaceable relative to the insulator. An annular conductive brush subassembly is coupled with the conductive disk and includes a plurality of (Continued)

electrically conductive fibers contactable with the shaft outer surface so as to provide a conductive path between the shaft and the disk.

19 Claims, 11 Drawing Sheets

(56) References Cited

U.S. PATENT DOCUMENTS

| | | | |
|---|---|---|---|
| 7,528,513 | B2 | 5/2009 | Oh |
| 9,581,203 | B2* | 2/2017 | White .................... F16C 33/62 |
| 10,050,490 | B1 | 8/2018 | Hubert et al. |
| 10,253,818 | B1 | 4/2019 | Ince et al. |
| 10,422,384 | B2 | 9/2019 | Hubert et al. |
| 10,931,179 | B2* | 2/2021 | Hubert .................. H01R 39/39 |
| 11,204,066 | B2* | 12/2021 | Feliciano ............. F16C 37/007 |
| 2003/0086630 | A1 | 5/2003 | Bramel et al. |
| 2005/0265643 | A1 | 12/2005 | Alsina et al. |
| 2014/0131512 | A1 | 5/2014 | Gyuricsko |
| 2016/0312834 | A1 | 10/2016 | White et al. |
| 2019/0226526 | A1 | 7/2019 | Hubert et al. |
| 2019/0296617 | A1 | 9/2019 | Hubert et al. |
| 2020/0224719 | A1 | 7/2020 | Colton et al. |
| 2021/0310517 | A1* | 10/2021 | Berruet ................. H02K 11/40 |
| 2021/0310520 | A1* | 10/2021 | Arnault ................. F16C 35/077 |
| 2021/0364040 | A1 | 11/2021 | Arnault et al. |
| 2021/0364041 | A1 | 11/2021 | Berruet et al. |

FOREIGN PATENT DOCUMENTS

| | | |
|---|---|---|
| DE | 102019200397 A1 | 7/2019 |
| FR | 1325720 A | 5/1963 |
| JP | 2015095440 A | 5/2015 |
| WO | 2016171929 A1 | 10/2016 |

OTHER PUBLICATIONS

Written Opinion and Search Report from the Italian Patent Office dated Dec. 11, 2020 in related Italian application No. 102020000007057, and translation thereof.

Written Opinion and Search Report from the Italian Patent Office dated Feb. 24, 2021 in related Italian applicatior No. 102020000012145, and translation thereof.

Written Opinion and Search Report from the Italian Patent Office dated Mar. 9, 2021 in related Italian application No. 102020000012151, and translation thereof.

Written Opinion and Search Report from the Italian Patent Office dated Dec. 23, 2020 in related Italian application No. 102020000007054, and translation thereof.

* cited by examiner

FIG.13 ured Apr. 3, 2020, the entire contents of which are fully incorporated herein by reference.

COMBINED INSULATOR AND CONDUCTOR ASSEMBLY FOR BEARINGS WITH ADJUSTABLE CONDUCTOR

CROSS-REFERENCE

This application claims priority to Italian Patent Application No. 102020000007054, filed Apr. 3, 2020, the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current and thereby prevent such current from passing through the bearing. These devices often include a plurality of conductive fibers spaced circumferentially about the entire outer surface of the shaft to form a relatively solid ring of fibers, such that current passes through the fibers between the shaft and the housing. Other devices or mechanisms are provided to electrically insulate the bearing in order to prevent current from passing through the bearing and may include insulative coatings or coverings.

SUMMARY OF THE INVENTION

In one aspect, the present invention is a combination electrical insulator and conductor assembly for a bearing disposable between a shaft and a housing, the bearing having an inner ring, an outer ring having an outer circumferential surface and opposing first and second axial ends, and a plurality of rolling elements between the rings, the housing having an inner circumferential surface. The assembly comprises an annular insulator disposable about the outer ring and configured to prevent electric current flow between the outer ring and the housing. An electrical conductor is movably coupled with the insulator and has an inner radial end and an outer radial end, the conductor outer radial end and/or a portion of the conductor between the inner and outer ends is conductively engageable with the housing and the conductor inner radial end is engageable with the shaft outer surface so as to provide a conductive path between the shaft and the housing.

In another aspect, the present invention is again a combined electrical insulator and conductor assembly for a bearing disposable between a shaft and a housing, the bearing having an inner ring, an outer ring having an outer circumferential surface and opposing first and second axial ends, and a plurality of rolling elements between the rings, the housing having an inner circumferential surface. The assembly comprises an annular insulator disposable about the outer ring and configured to prevent electric current flow between the outer ring and the housing, the insulator having a centerline and a plurality of projections extending axially along and spaced circumferentially about the centerline. An electrically conductive disk is coupled with the insulator so as to be axially adjacent to the bearing, the disk having a centerline, an outer radial end engageable with the housing inner surface, an inner radial end defining a central opening for receiving a portion of the shaft and a plurality of openings spaced circumferentially about the centerline, each opening receiving a separate one of the plurality of projections of the insulator such that the disk is axially displaceable relative to the insulator along the projections. An annular conductive brush subassembly is coupled with the conductive disk and includes a centerline and a plurality of electrically conductive fibers, the conductive fibers being spaced circumferentially about the centerline and extending radially inwardly from the inner end of the conductive disk, each conductive fiber having an inner end contactable with the shaft outer surface so as to provide a conductive path between the shaft and the disk.

BRIEF DESCRIPTION OF THE SEVERAL VIEWS OF THE DRAWING

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 10A and 10B, collectively FIG. 10, are each a broken-away, axial cross-sectional view of the components of an insulator during assembly;

FIGS. 12A and 12B, collectively FIG. 12, are each a broken-away, axial cross-sectional view of an insulator and a conductive disk during assembly.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 a combined electrical insulator and conductor assembly 10 for a bearing 1 disposable between a shaft 2 rotatable about a central axis $A_C$ and a housing 3. The bearing 1 has an inner ring 4, an outer ring 5 with opposing first and second axial ends 5a, 5b, respectively, and an outer surface 5c, and a plurality of rolling elements 6 disposed between the rings 4 and 5. The shaft 2 has an outer circumferential surface 2a and the housing 3 has an inner circumferential surface 3a defining a bore 7. Preferably, the bearing 1, the shaft 2 and the housing 3 are components of a motor or other electrical machine (e.g., a generator) or any other machine having rotating components likely to accumulate electric charge or convey electric current.

The combined insulator and conductor assembly 10 basically comprises an annular insulator 12 disposable about the bearing outer ring 5 and configured to prevent electric current flow between the bearing outer ring 5 and the housing 3, and thus through the bearing 1, and an electrical conductor 11 movably coupled with the insulator 12 and having an inner radial end 11a and an outer radial end 11b. Either the conductor outer radial end 11b and/or a portion of the conductor 11 between the inner and outer ends 11a, 11b, respectively, is conductively engageable with the housing 3 and the conductor inner radial end 11a is engageable with the shaft outer surface 2a so as to provide a conductive path between the shaft 2 and the housing 3. As used herein, the term "conductively engageable" means establishing an electrically conductive path through direct contact or through contact with one or more intermediate components or members 7 (FIG. 13) so as to enable electric current to flow between the engaged members, in particular the conductor 11 and the housing 3. Preferably, the conductor 11 includes an electrically conductive disk 14 coupled with the insulator 12 so as to be axially adjacent to the bearing 1 and a brush subassembly 16 coupled with the disk 14 and having a plurality of conductive fibers 18 contactable with the shaft 2, the disk 14 and brush subassembly 16, as described in detail below.

More specifically, the insulator 12 has a centerline 13 and a plurality of projections 20 extending axially along and spaced circumferentially about the centerline 13. The conductive disk 14 has a centerline 15, an outer radial end 14a engageable with the housing inner surface 3a and providing the conductor outer radial end 11b, and an inner radial end 14b defining a central opening 17 for receiving a portion of the shaft 2. The disk 14 also has opposing first and second axial ends 14c, 14d and a plurality of openings 22 extending between the axial ends 14c, 14d and spaced circumferentially about the centerline 15. Each disk opening 22 receives a separate one of the plurality of projections 20 of the insulator 12 to movably couple the disk 14 with the insulator 12, the disk centerline 15 then being generally coaxial with the insulator centerline 13. As such, the disk 14 is "floating" or axially displaceable relative to the insulator 12 by sliding along the length of the projections 20, to enable adjustment of the position of the disk 14, and thereby also the brush subassembly 16, relative to the insulator 12 and the bearing 1.

Furthermore, the conductive brush subassembly 16 has a centerline 16a and the conductive fibers 18 are spaced circumferentially about the centerline 16a and extend radially inwardly from the inner end 14b of the conductive disk 14. Each conductive fiber 18 is preferably formed of carbon and has an inner end 18a contactable with the shaft outer surface 2a so as to provide a conductive path between the shaft 2 and the disk 14, the fiber inner ends 18a collectively providing the conductor inner end 11a. As the disk 14 is configured to provide a conductive path between the brush subassembly 16 and the housing 3, any current or charge on the shaft 1 is directed to flow through the assembly 10, rather than through the bearing 1. Thus, the combination insulator and conductor assembly 10 functions to protect the bearing 10 both by preventing direct current flow through the bearing 1 (i.e., due to the insulator 12) and by providing an alternative path for current adjacent to the bearing 1 by means of the conductor 11. Having described in basic structure and functions above, these and other components of the assembly are discussed in detail below.

Referring now to FIGS. 4-6, 10 and 11, the insulator 12 preferably includes an insulative ring 30 coupled with the first axial end 5a of the bearing outer ring 5 and providing the axial projections 20 and a tubular insulator body 32 disposed about the outer ring 5 and coupled with the insulative ring 30. The insulative ring 30 is formed of an insulative material, preferably glass-filled Nylon and most preferably PA66-GF35, but may be formed of any other appropriate. Preferably, the insulative ring 30 is generally circular and has an axial portion 34 disposed about a portion of the outer surface 5c of the bearing outer ring 5 and a radial portion 36 extending inwardly from the axial portion 34.

Figure 1:
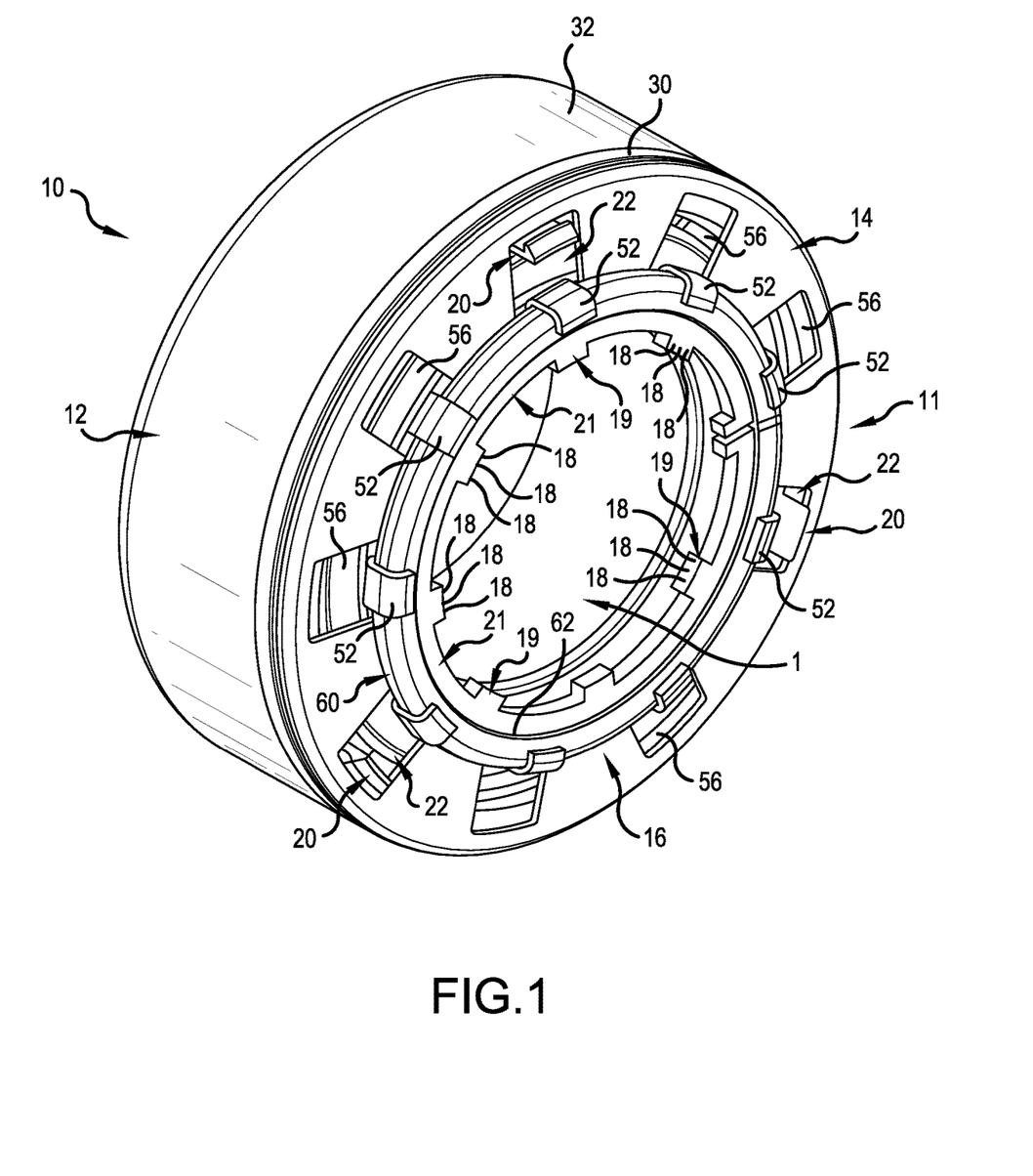
FIG. 1 is a perspective view of a combination insulator and conductor assembly in accordance with the present invention, shown installed on a bearing.
Figure 2:
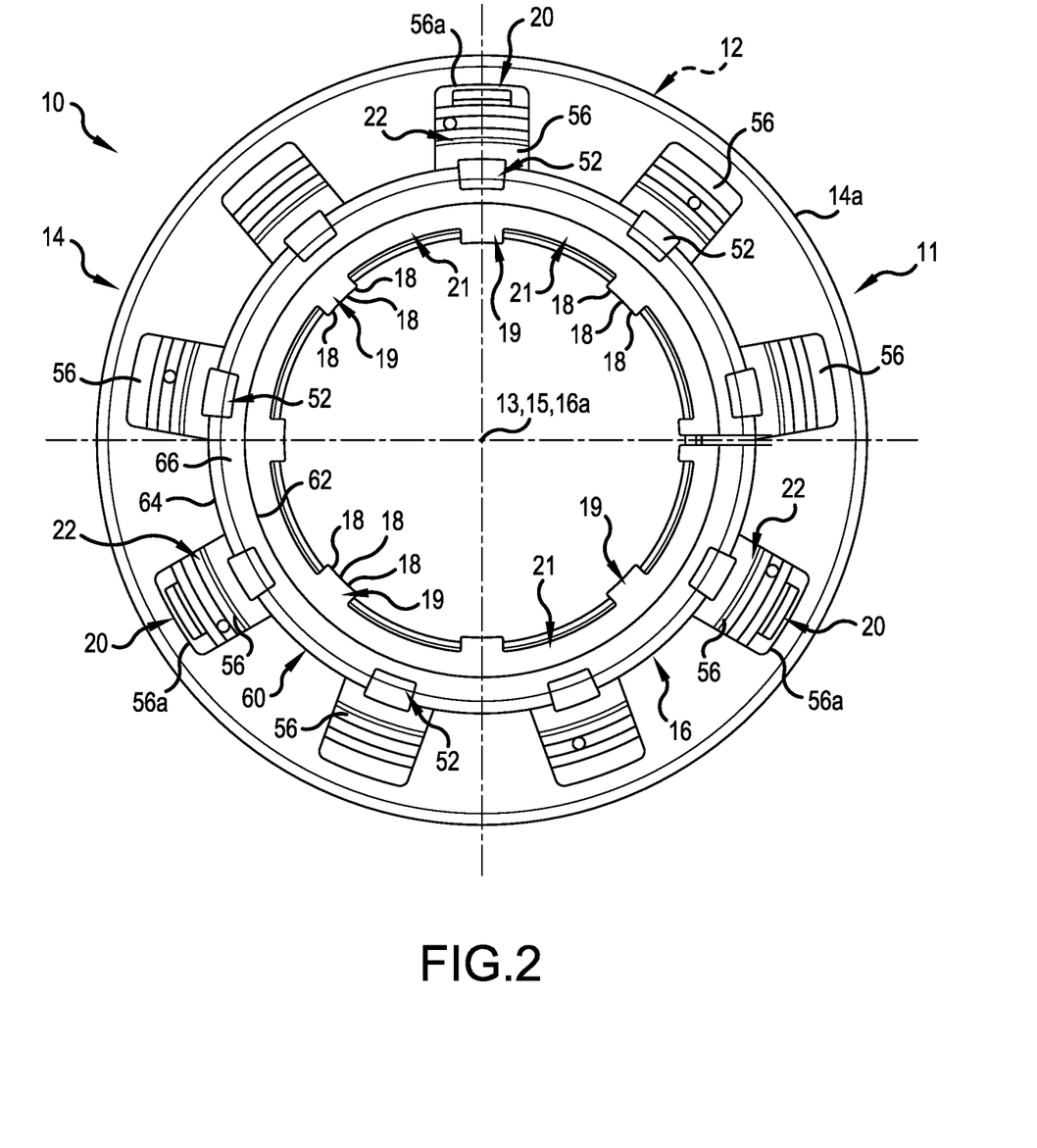
FIG. 2 is a side plan view of the combination insulator and conductor assembly.
Figure 3:
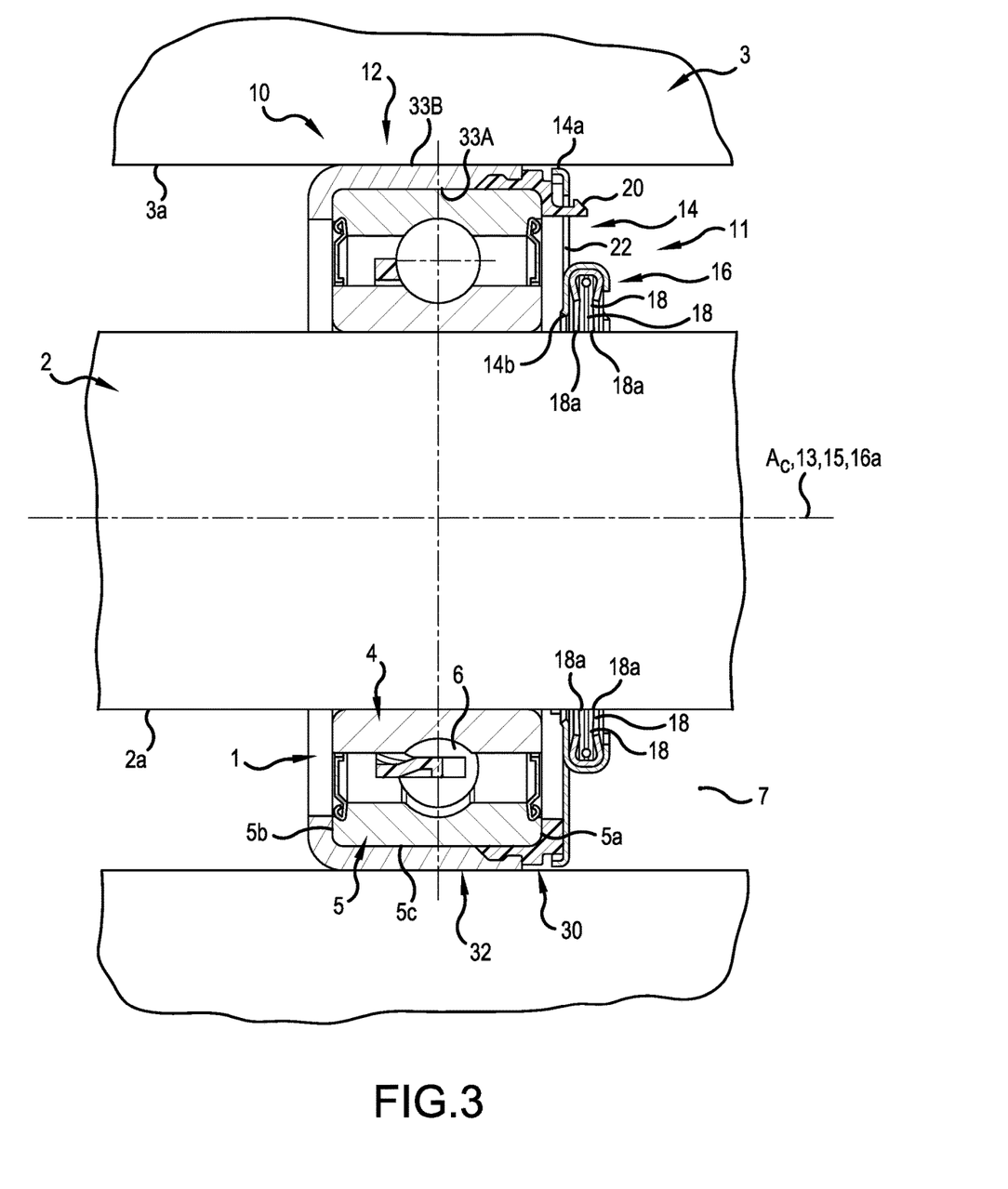
FIG. 3 is an axial cross-sectional view of the combination insulator and conductor assembly, shown installed on a shaft and within a housing.
Figure 4:
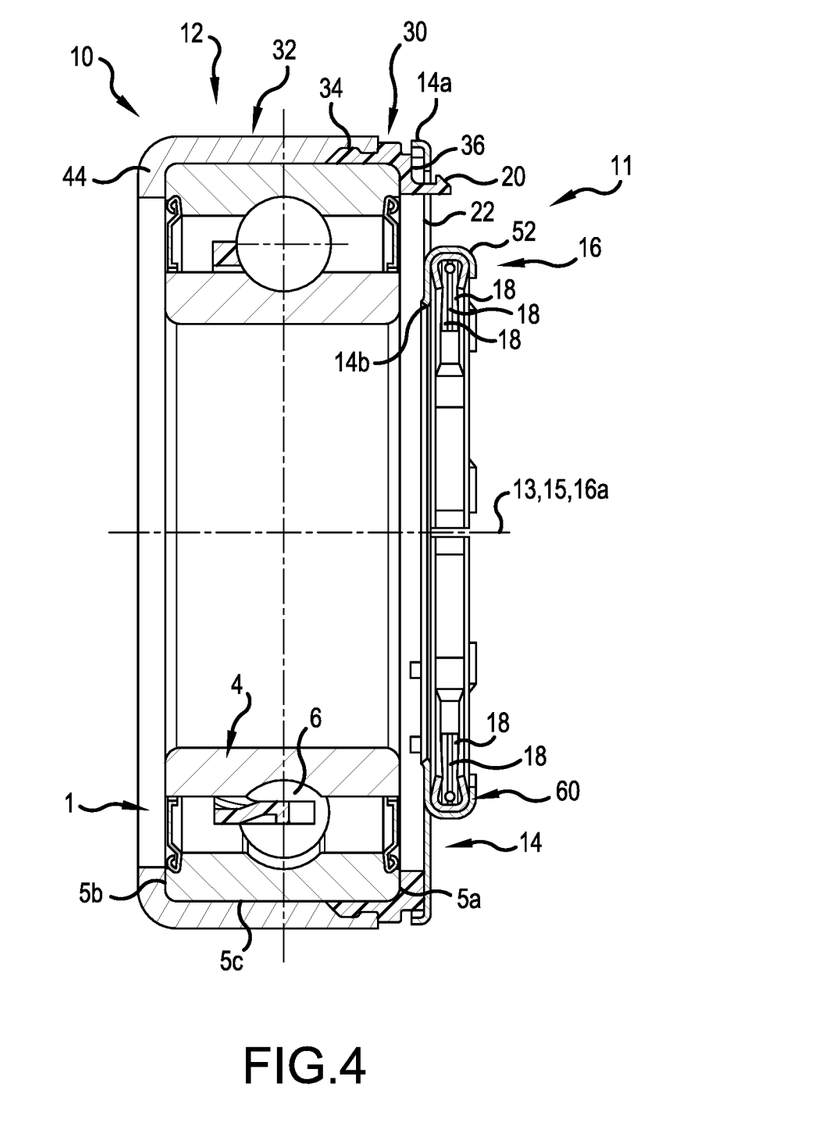
FIG. 4 is an axial cross-sectional view of the combination insulator and conductor assembly.
Figure 5:
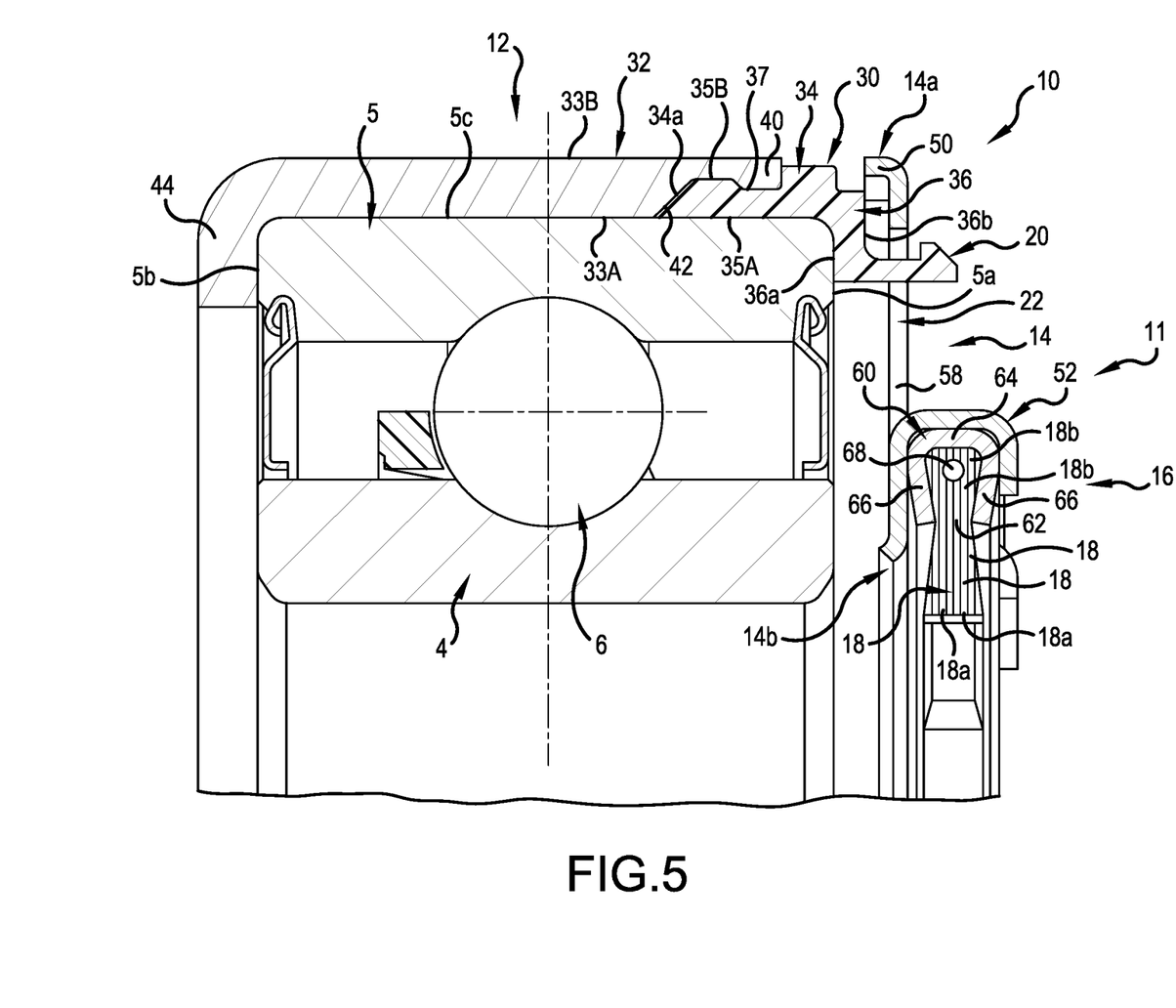
FIG. 5 is a broken-away, enlarged view of an upper portion of FIG. 4.
Figure 6:
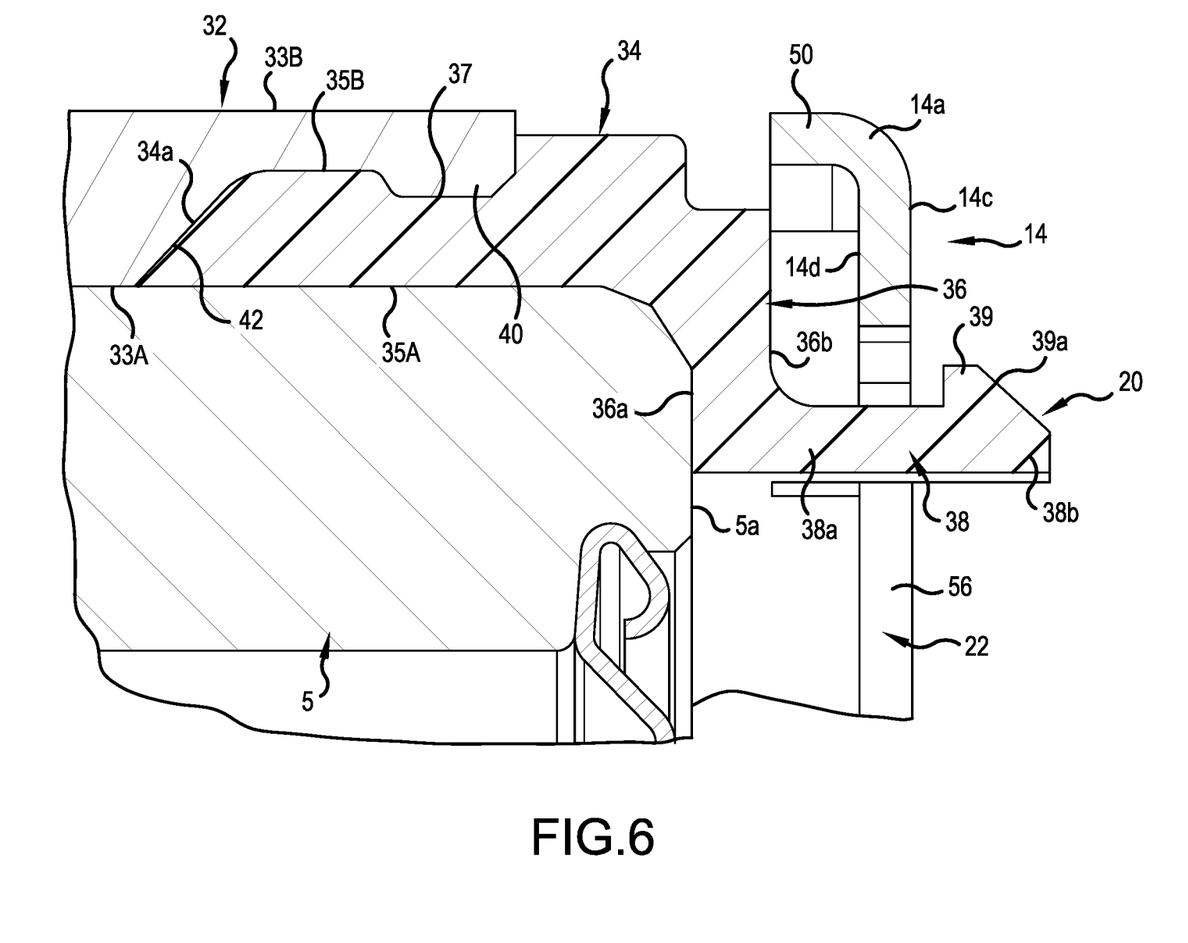
FIG. 6 is a more enlarged view of a portion of FIG. 5.
Figures 7, 8, 9:
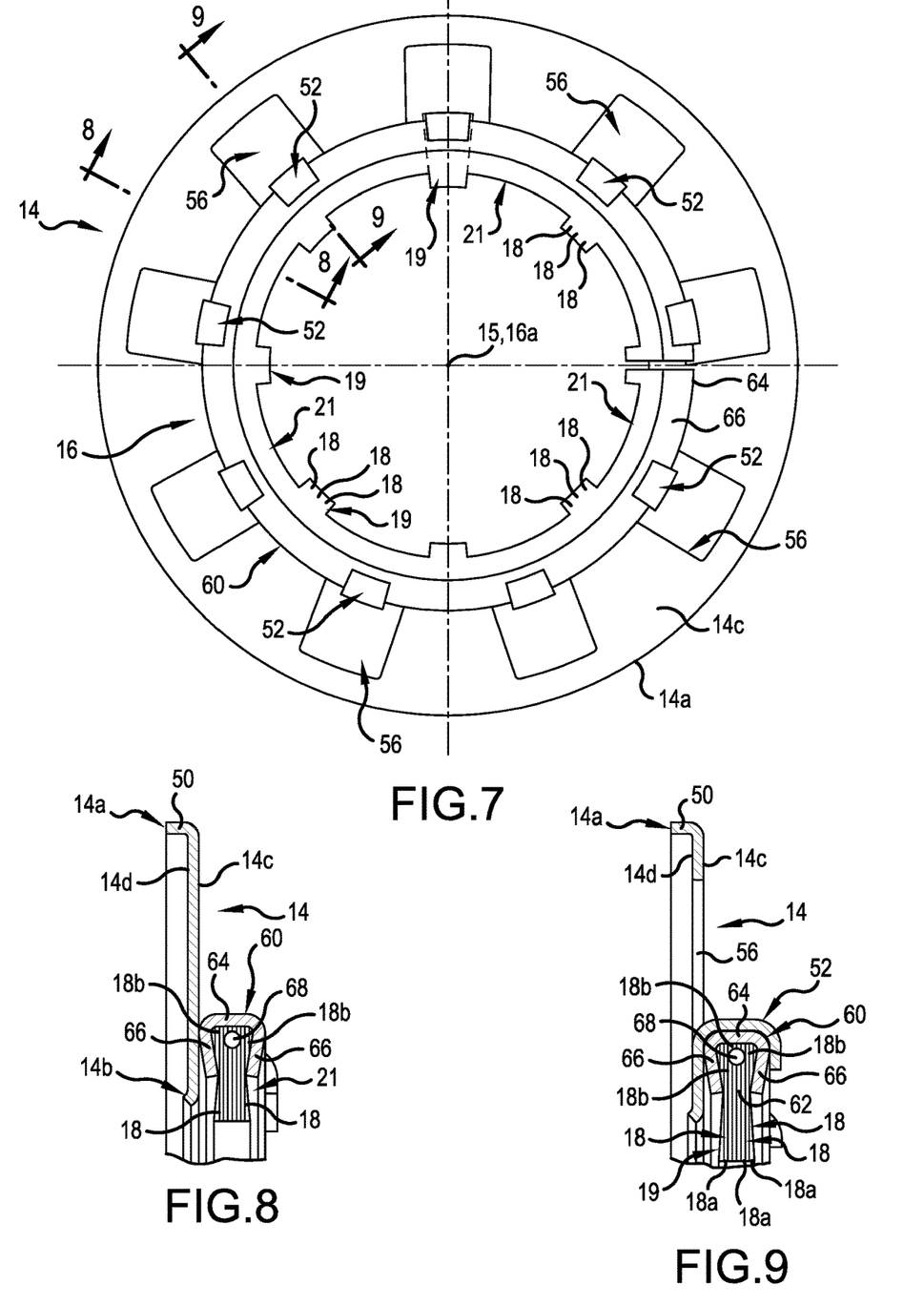
FIG. 7 is a side plan view of a conductive disk and conductive brush subassembly.
FIG. 8 is a view through line 8-8 of FIG. 7.
FIG. 9 is a view through line 9-9 of FIG. 7.

The ring axial portion 34 has an inner circumferential surface 35A disposed about the portion of the ring outer surface 5c, an opposing outer circumferential surface 35B and an annular groove 37. The annular groove 37 extends radially inwardly from the outer surface 35B and circumferentially about the insulator centerline 13 and is configured to receive an annular shoulder 40 of the tubular body 32, as described below. Preferably, the ring axial portion 34 further has an angled lead-in edge 34a to facilitate coupling with the tubular body 32, as described below.

Further, the radial portion 36 of the ring 30 has a first axial end 36a disposed against the first axial end 5a of the bearing outer ring 5 and an opposing second axial end 36b, with the plurality of projections 20 extending axially from the second axial end 36b. Preferably, each projection 20 is formed as a generally rectangular bar 38 having an inner end 38a integrally formed with the ring radial portion 36 and an opposing, free outer end 38b having a retainer lug 39. The retainer lugs 39 collectively retain the conductive disk 14 on the projections 20 and each lug 39 has a tapered lead-in edge 39a to facilitate insertion through the disk openings 22, as described below.

Still referring to FIGS. 4-6, the tubular insulator body 32 is generally circular cylindrical and has opposing inner and outer circumferential surfaces 33A, 33B, respectively, and opposing axial ends 32a, 32b, respectively. The insulator body 32 is preferably formed of aluminum and has at least one layer of oxidation formed on either or both of the circumferential surfaces 33A, 33b, preferably formed by anodization, but may alternatively be formed of an appropriate insulative material (e.g., a rigid polymer or a ceramic) or another anodized metallic material. The inner circumferential surface 33A of the body 32 is disposable about the outer surface 5c of the bearing outer ring 5 and the outer circumferential surface 33B is engageable with the housing inner surface 3a to axially retain the bearing 5. Further, the tubular insulator body 32 preferably has an annular shoulder 40 extending radially inwardly from the inner surface 33A adjacent to the first axial end 32a and an angled engagement surface 42 adjacent to the shoulder 40. Preferably, a flange 44 extends radially inwardly from the second axial end 32b of the insulator body 32 and is disposable against the second axial end 5b of the bearing 5 to insulate the bearing axial end 5b.

Figure 10A:
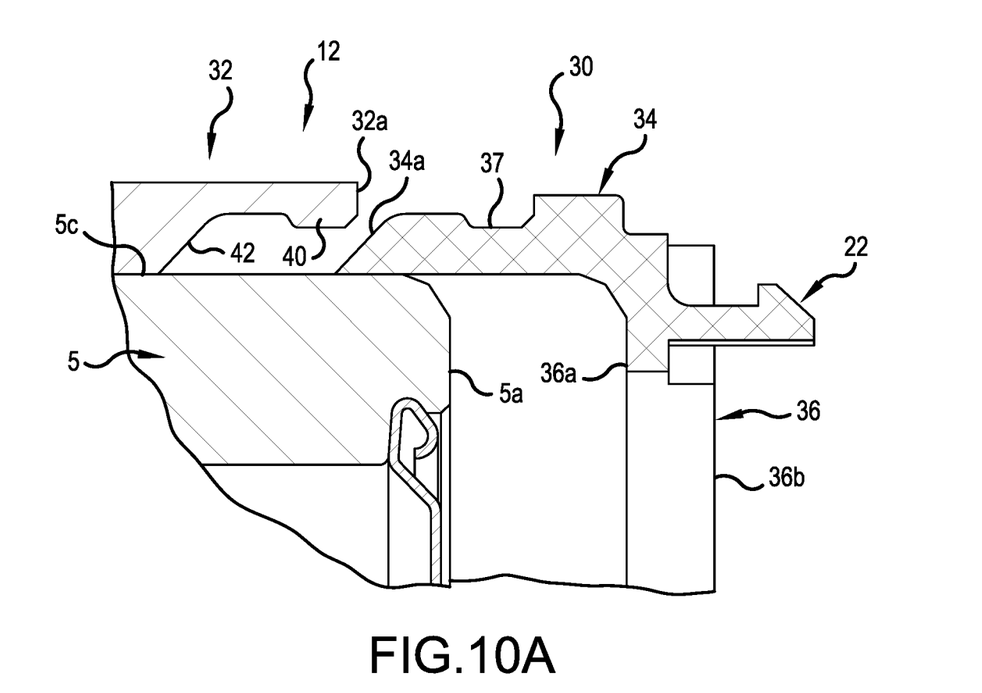
Figure 10B:
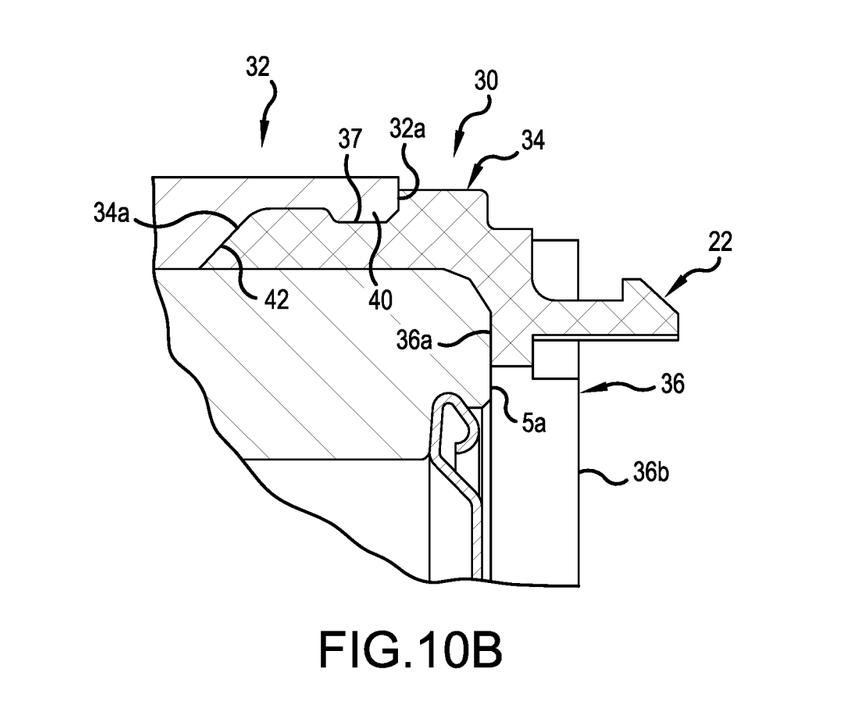
Figure 11:
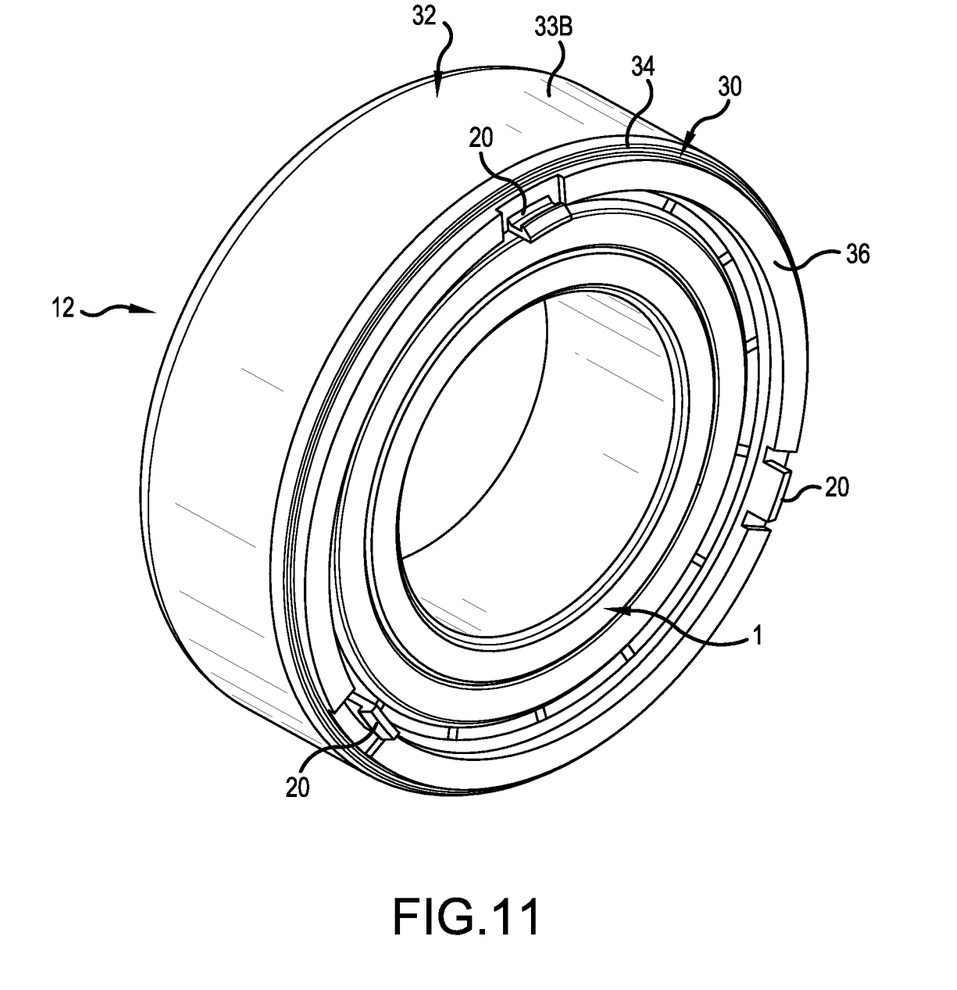
FIG. 11 is a perspective view of an installed insulator without a conductive disk and brush subassembly.

Referring to FIGS. 5 and 10, with the above structure, the preferred two-piece insulator 12 is installed about of bearing outer ring 5 in the following manner. The insulator body 32 is first installed about the bearing outer ring 5 by inserting the bearing second axial end 5b into the first axial end 32a of the tubular body 32, and then sliding the body inner surface 33A about the ring outer surface 5c until the flange 44 is abutted against the ring second end 5b. Then, the insulative ring 30 is installed on the bearing outer ring 5 by inserting the bearing first axial end 5a into the free end of the ring axial portion 34, as shown in FIG. 10A. The ring axial portion 34 is displaced toward the tubular body 32 such that the angled lead-in surface 34a of the ring 30 bends the first axial end 32a of the tubular body 32 radially outwardly until the shoulder 40 snaps into the recess 37 of the ring 30. At this point, the angled lead-in surface 34a is disposed against the tubular body engagement surface 42 and the first axial end 36a of the ring radial portion 36 is disposed against the first axial end 5a of the bearing outer ring 5, as depicted in FIG. 10B. Preferably, the insulative ring 30 is then molded (e.g., by application of heat) to the bearing outer ring 5 to fixedly retain the insulator 12 about the bearing 1.

Referring to FIGS. 5-9, the conductive disk 14 is generally circular and preferably formed of a conductive metallic material, most preferably aluminum but may be formed of any other appropriate material (e.g., low carbon steel). The conductive disk 14 preferably has an outer flange 50 extending axially from the outer radial end 14a of the disk 14 and conductively engageable with the housing inner surface 3a, preferably increasing the surface area of the disk 14 in conductive contact with the housing 3. Further, the disk 14 preferably further includes a plurality of mounting tabs 52 spaced circumferentially about the centerline 15, each mounting tab 52 being engaged with the brush subassembly 16 to couple the brush subassembly 16 with the disk 14.

Preferably, each mounting tab 52 is formed by cutting (e.g., by die punching) through the disk 14 to form a rectangular tab 52 and a clearance hole 56. Each tab 52 is bended about a retainer 60 (described below) of the brush subassembly 16, such that each engaged mounting tab 52 is generally C-shaped, and the clearance holes 56 provide passages for fluids (e.g., lubricants, air, etc.) to flow through the conductive disk 14 so as to pass to and from the bearing 1. Further, a portion or number of the clearance holes 56 provide the openings 22 for the insulator projections 20, such that each projection 20 extends through a separate one of disk clearance holes 56, as described below.

Figure 12A:
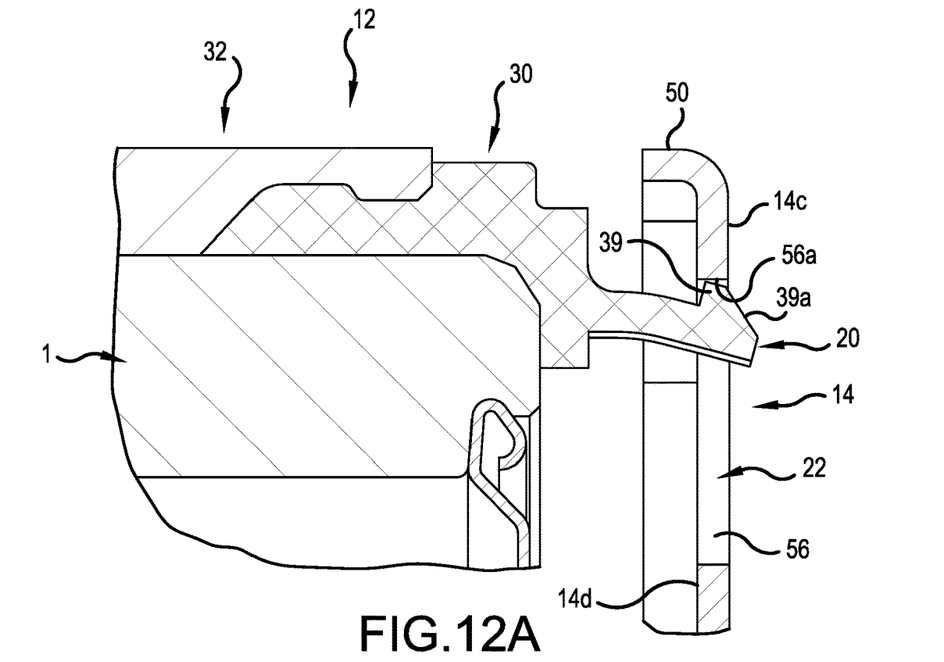
Figure 12B:
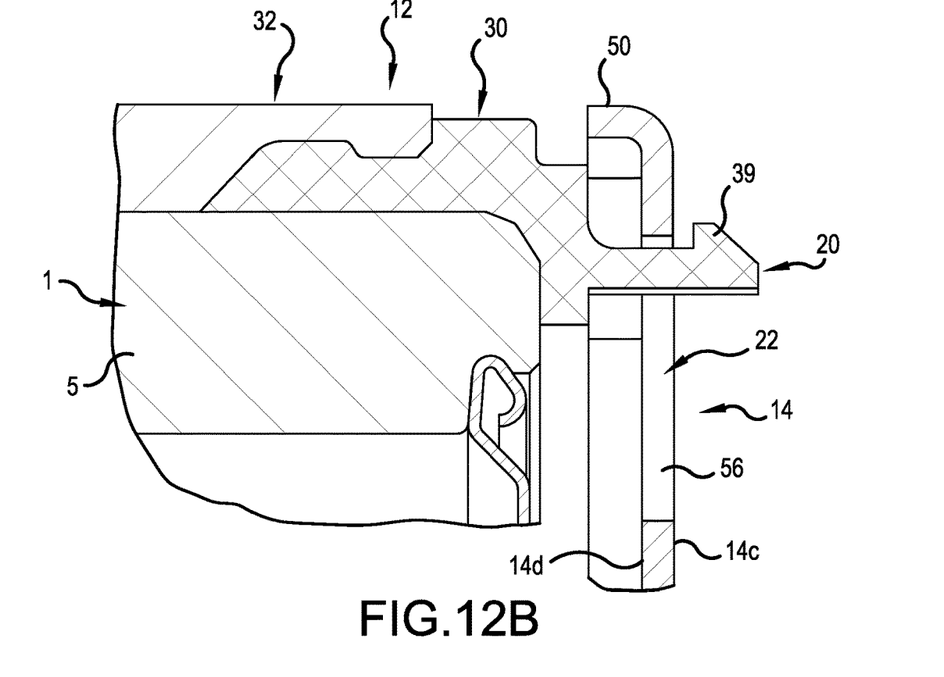

Referring to FIG. 12, the conductive disk 14 is coupled with the insulator 12 by displacing the disk 14 axially toward the insulator 12 installed on the bearing 1 until the lead-in edge 39a of each projection lug 39 engages with the outer edge 56a of each opening 20/hole 56, as shown in FIG. 12A. The engagement of the retainer edge 39a with the hole edge 56a bends or deflects the projection bar 38 radially inwardly until each projection retainer lug 39 is disposed outwardly of the first axial end 14c of the disk 14, as depicted in FIG. 12B. At this point, the conductive disk 14 is movably coupled with the insulator 12 so as to be axially displaceable along the projections 20, which permits a certain amount of adjustment of the position of the disk 14 and brush subassembly 16 relative to the bearing 1.

Referring now to FIGS. 2, 5, 8 and 9, the conductive brush subassembly 16 preferably includes the annular retainer 60 connected with the conductive disk 14, as described above, and having an open inner radial end 60a with an annular groove 62 and a closed outer end 60b. Each one of the plurality of conductive fibers 18 has an outer radial end 18b disposed within the groove 62 and extends radially inwardly from the retainer 60 and toward the shaft 2. More specifically, the retainer 60 has an outer axial base 64 and two opposing radial legs 66, such that retainer 60 has generally C-shaped axial cross-sections. The retainer legs 66 preferably clamp against the outer ends 18b of the conductive fibers 18 to retain the fibers 18 within the groove 62.

Further, the brush subassembly 16 preferably includes a circular hoop 68 disposed within the retainer groove 62 and each one of the plurality of conductive fibers 18 is bended about the hoop 68. As such, each conductive fiber 18 is preferably generally U-shaped or V-shaped and has two inner ends 18a contactable with the shaft outer surface 2a. However, each one of the conductive fibers 18 may be arranged to extend as a generally straight strand (not shown) from the outer radial end 18b to the inner radial end 18a.

Furthermore, the plurality of conductive fibers 18 of the brush subassembly 16 are either arranged in a generally continuous ring of fibers (not shown) or preferably as a plurality of circumferentially spaced discrete sets 19 of fibers 18. In the latter preferred case, the sets 19 of fibers 18 are preferably formed by die-cutting a brush assembly 16 including a continuous ring of fibers 18 such that the fiber sets 19 contactable with the shaft 2 are spaced apart by sets 21 of shorter length fibers 18. Also, each conductive fiber 18 is preferably sized having a diameter within the range of five micrometers or microns (5 µm) to one hundred microns (100 µm). Although each conductive fiber 18 is preferably formed of carbon as discussed above, the fibers 18 may alternatively be fabricated of any appropriate electrically conductive material, such as a metallic material, a conductive polymer, etc.

Although the conductor 11 preferably includes the conductive disk 14 and the brush subassembly 16 as described above and depicted in the drawing figures, the conductor 11 may alternatively be formed in any other appropriate manner that is both coupleable with the insulator 12 and capable of providing one or more conductive paths between the shaft 2 and the housing 3. For example, the conductor 11 may include, instead of the brush subassembly 16, a solid ring of a conductive material (not shown) attached to the conductive disk 14 and conductively engageable with the shaft 2, the ring having either a continuous inner circumferential contact surface or a plurality of arcuate contact surface sections provided by radially-inwardly extending projections. As a further alternative, the conductive disk 14 may be formed having an inner end 14b contactable with the shaft outer surface 2a to provide a direct conductive path between the shaft 2 and the disk 14. The scope of the present invention encompasses these and all other appropriate constructions of the conductor 11 capable of functioning generally as described herein.

Figure 13:
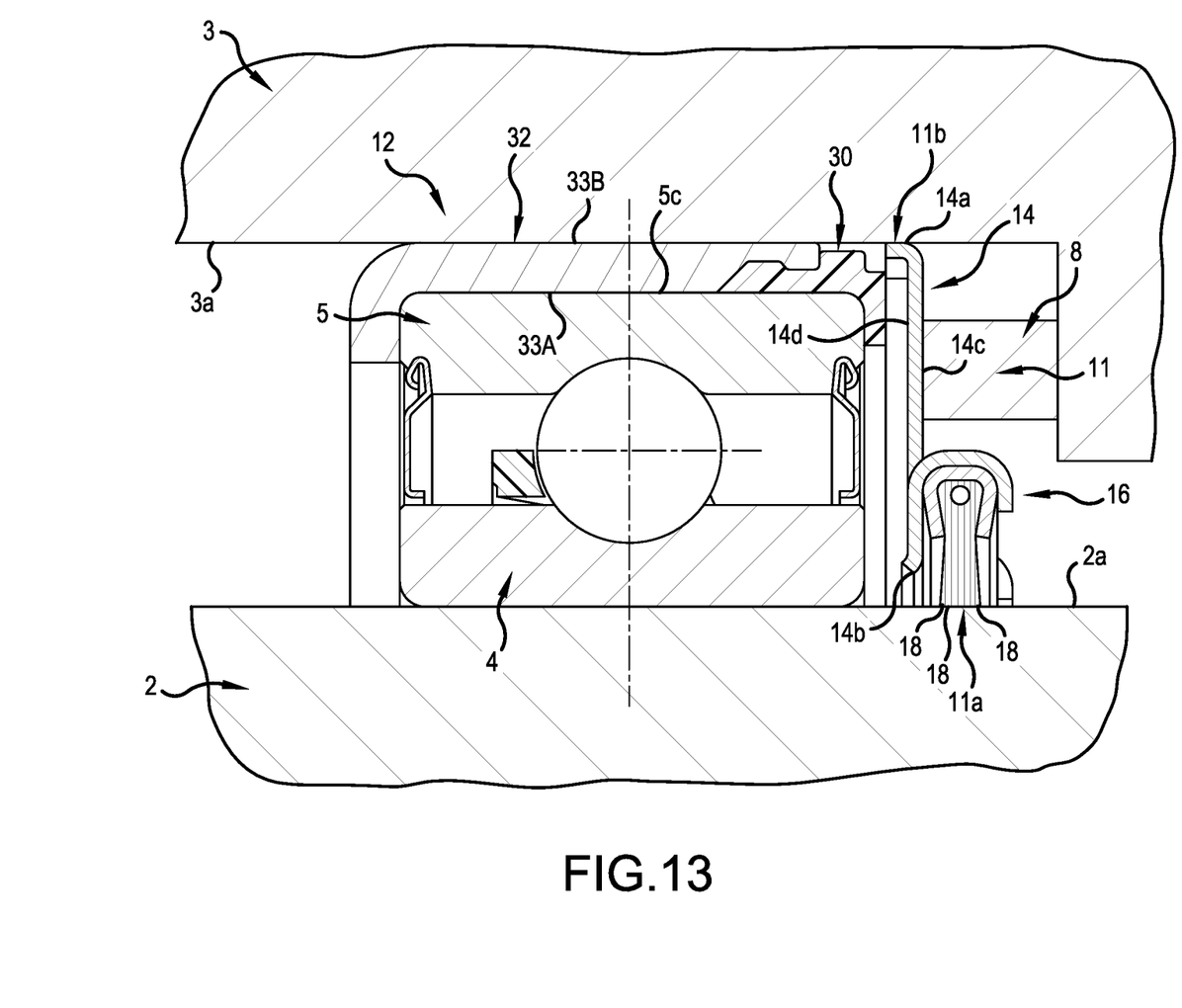
FIG. 13 is an enlarged, broken-away axial cross-sectional view of the combination insulator and conductor assembly, shown installed on a shaft and within a housing and engaged by a machine component.

The insulator/conductor assembly 10 of the present invention is more effective at protecting a bearing 1 from damage caused by electric current than previously known devices. The insulator 12 effectively prevents a voltage difference from being established between the shaft 2 and the housing 3 through the bearing 1, such that electric current is prevented from flowing through the inner and outer rings 4, 5 and the rolling elements 6. To further assure that electric current will not pass through the bearing 1, the conductive disk 14 and the brush subassembly 16 provide an alternative path for any charge or current on the shaft 2 to pass through the conductive fibers 18 to the retainer 60, through the retainer 60 and into the conductive disk 14, then passing through the disk outer flange 50 and into the housing 3. Additional or alternative conductive paths into the housing 3 may be provided by axial contact between a portion of the housing 3 (e.g., a radial shoulder) or a component 7 of the machine disposed within the housing 3, such as a spring, a pin, etc., and either a surface of the conductive disk 14, as shown in FIG. 13, or/and of the annular retainer 60. Thus, any charge or current on the shaft 2 in the region of the bearing 1 is both prevented from passing through the bearing 1 by the insulator 12 and shunted to pass through the brush subassembly 16 and the conductive disk 14 of the conductor 11. Further, the assembly 10 may be installed on the bearing 1 by a manufacturer or a distributor, such that a bearing 1 with combined insulator and conductor assembly 10 may be provided to a customer or end user as an entire assembly ready to be installed on a shaft 2 and within a housing 3.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. The invention is not restricted to the above-described embodiments and may be varied within the scope of the following claims.

We claim:

1. A combined electrical insulator and conductor assembly for a bearing disposable between a shaft and a housing, the bearing having an inner ring, an outer ring having an outer circumferential surface and opposing first and second axial ends, and a plurality of rolling elements between the rings, the housing having an inner circumferential surface, the assembly comprising:
   an annular insulator disposable about the bearing outer ring and configured to prevent electric current flow between the outer ring and the housing; and
   an electrical conductor movably coupled with the insulator and having an inner radial end and an outer radial end, at least one of the conductor outer radial end and a portion of the conductor between the inner and outer ends being conductively engageable with the housing and the conductor inner radial end being engageable with the shaft outer surface so as to provide a conductive path between the shaft and the housing;
   the insulator has a centerline and a plurality of projections extending axially along and spaced circumferentially about the centerline and the conductor has a plurality of openings spaced circumferentially about the centerline, each opening receiving a separate one of the plurality of projections of the insulator such that the conductor is axially displaceable relative to the insulator along the projections.

2. The assembly as recited in claim 1 wherein the insulator includes:
   an insulative ring coupled with the first axial end of the bearing outer ring, formed of an electrically insulative material and providing the projections; and
   a tubular insulator body having an inner circumferential surface disposable about the outer surface of the bearing outer ring and an outer circumferential surface engageable with the housing inner surface, a first axial end coupled with the insulative ring and an opposing second axial end, the insulator body being formed of an electrically insulative material or provided with an insulative layer on at least one of the inner and outer surfaces.

3. The assembly as recited in claim 2 wherein the insulative ring has an axial portion disposed about a portion of the outer surface of the bearing outer ring and a radial portion extending inwardly from the axial portion and having a first axial end disposed against the first axial end of the bearing outer ring, and an opposing second axial end, the plurality of projections extending axially from the second axial end.

4. The assembly as recited in claim 3 wherein the insulative ring has an annular groove and the first axial end of the insulator tubular body has an annular projection disposed in the annular groove to couple the insulator body with the insulative ring.

5. The assembly as recited in claim 1 wherein the conductor includes:
   an electrically conductive disk having an outer end forming the conductor outer end, an inner end defining central opening for receiving a portion of the shaft and a plurality of through-holes disposed between the inner and outer ends which form the conductor openings; and
   an annular conductive brush subassembly coupled with the conductive disk and including a centerline and a plurality of electrically conductive fibers, the conductive fibers being spaced circumferentially about the centerline and extending radially inwardly from the inner end of the conductive disk, each conductive fiber having an inner end contactable with the shaft outer surface which forms the conductor inner radial end.

6. The assembly as recited in claim 5 wherein the conductive disk includes a plurality of mounting tabs spaced circumferentially about the centerline, each mounting tab being engaged with the brush subassembly to couple the brush subassembly with the conductive disk.

7. The assembly as recited in claim 6 wherein each mounting tab is formed by cutting through the disk to form the tab and a separate one of the disk through holes.

8. The assembly as recited in claim 5 wherein the conductive brush subassembly includes an annular retainer connected with the conductive disk and having an inner radial end with an annular groove, each one of the plurality of conductive fibers having an outer radial end disposed within the groove and extending radially inwardly from the retainer and toward the shaft.

9. The assembly as recited in claim 8 wherein at least one of:
   the brush subassembly further includes a circular hoop disposed within the retainer and each one of the plurality of conductive fibers is bent about hoop such that each fiber has two ends contactable with the shaft outer surface; and the plurality of conductive fibers of the brush subassembly are arranged in a plurality of circumferentially spaced discrete sets of fibers.

10. A bearing assembly comprising:

a bearing disposable between a shaft and a housing having an inner circumferential surface, the bearing having an inner ring, an outer ring having an outer circumferential surface and opposing first and second axial ends, and a plurality of rolling elements between the rings;

an annular insulator disposable about the outer ring and configured to prevent electric current flow between the outer ring and the housing, the insulator having a centerline and a plurality of projections extending axially along and spaced circumferentially about the centerline;

an electrically conductive disk coupled with the insulator so as to be axially adjacent to the bearing, the disk having a centerline, an outer radial end engageable with the housing inner surface, an inner radial end defining a central opening for receiving a portion of the shaft and a plurality of openings spaced circumferentially about the centerline, each opening receiving a separate one of the plurality of projections of the insulator such that the disk is axially displaceable relative to the insulator along the projections; and an annular conductive brush subassembly coupled with the conductive disk and including a centerline and a plurality of electrically conductive fibers, the conductive fibers being spaced circumferentially about the centerline and extending radially inwardly from the inner end of the conductive disk, each conductive fiber having an inner end contactable with the shaft outer surface so as to provide a conductive path between the shaft and the disk.

11. The bearing assembly as recited in claim 10 wherein the insulator includes:

an insulative ring coupled with the first axial end of the bearing outer ring, formed of an electrically insulative material and providing the projections; and a tubular insulator body having an inner circumferential surface disposeable about the outer surface of the bearing outer ring and an outer circumferential surface engageable with the housing inner surface, a first axial end coupled with the insulative ring and an opposing second axial end, the insulator body being formed of an electrically insulative material or provided with an insulative layer on at least one of the inner and outer surfaces.

12. The bearing assembly as recited in claim 11 wherein the insulative ring has an axial portion disposed about a portion of the outer surface of the bearing outer ring and a radial portion extending inwardly from the axial portion and having a first axial end disposed against the first axial end of the bearing outer ring, and an opposing second axial end, the plurality of projections extending axially from the second axial end.

13. The bearing assembly as recited in claim 11 wherein the insulative ring has an annular groove and the first axial end of the tubular insulator body has an annular projection disposed in the annular groove to couple the tubular insulator body with the insulative ring.

14. The bearing assembly as recited in claim 10 wherein the conductive disk includes a flange extending axially from the outer radial end of the disk and engageable with the housing inner surface.

15. The bearing assembly as recited in claim 10 wherein the conductive disk includes a plurality of mounting tabs spaced circumferentially about the centerline, each mounting tab being engaged with the brush subassembly to couple the brush subassembly with the conductive disk.

16. The bearing assembly as recited in claim 15 wherein each mounting tab is formed by cutting through the disk to form a rectangular tab and a clearance hole, a plurality of the disk clearance holes each forming a separate one of the openings for receiving the projections of the insulator.

17. The bearing assembly as recited in claim 10 wherein the conductive brush subassembly includes an annular retainer connected with the conductive disk and having an inner radial end with an annular groove, each one of the plurality of conductive fibers having an outer radial end disposed within the groove and extending radially inwardly from the retainer and toward the shaft.

18. The bearing assembly as recited in claim 17 wherein the brush subassembly further includes a circular hoop disposed within the retainer and each one of the plurality of conductive fibers is bent about hoop such that each fiber has two ends contactable with the shaft outer surface.

19. The bearing assembly as recited in claim 10 wherein the plurality of conductive fibers of the brush subassembly are arranged in one of a generally continuous ring of fibers and a plurality of circumferentially spaced discrete sets of fibers.

* * * * *